United States Patent [19]

Kataoka et al.

[11] Patent Number: 4,543,929
[45] Date of Patent: Oct. 1, 1985

[54] TURBULENCE GENERATING METHOD AND INTERNAL COMBUSTION ENGINE FOR CARRYING OUT THE SAME

[75] Inventors: Masao Kataoka; Yujiro Oshima; Takashi Noda; Shigeo Suzuki, all of Aichi, Japan

[73] Assignee: Kabushiki Kaisha Toyota Chuo Kenkyusho, Aichi, Japan

[21] Appl. No.: 534,449

[22] Filed: Sep. 21, 1983

[30] Foreign Application Priority Data

Sep. 21, 1982 [JP] Japan .................... 57-165791

[51] Int. Cl.⁴ .................... F02B 19/08; F02B 23/02
[52] U.S. Cl. .................... 123/263; 123/276; 123/661
[58] Field of Search ............ 123/262, 263, 276, 275, 123/661

[56] References Cited

U.S. PATENT DOCUMENTS

| | | | |
|---|---|---|---|
| 2,644,433 | 7/1953 | Anderson | 123/276 X |
| 4,176,628 | 12/1979 | Kanai et al. | 123/276 X |
| 4,221,190 | 9/1980 | Komiyama et al. | 123/276 |
| 4,300,498 | 11/1981 | May | 123/276 X |
| 4,331,115 | 5/1982 | May | 123/661 X |

FOREIGN PATENT DOCUMENTS

| | | | |
|---|---|---|---|
| 88194 | 11/1959 | Denmark | 123/276 |
| 1072001 | 12/1955 | Fed. Rep. of Germany | 262/ |

Primary Examiner—Tony M. Argenbright
Attorney, Agent, or Firm—Sughrue, Mion, Zinn, Macpeak & Seas

[57] ABSTRACT

Disclosed are a turbulence generating method for an internal combustion engine and an internal combustion engine for carrying out that method. Main and auxiliary recesses communicating with each other are formed by at least two projections in the combustion chamber of a reciprocating internal combustion engine, which is defined by a piston, a cylinder head and a cylinder block. A swirling mechanism for swirling the intake air is disposed in an intake mechanism for supplying the intake air into the combustion chamber. A swirl of intake air is generated in the main recess by the swirling mechanism and is accelerated and introduced into the main recess as the piston rises. A turbulent layer is formed while the swirl is converted occasionally into turbulences by the projections. Secondary swirls other than the main swirl are generated in the auxiliary recesses. Turbulences are further generated between the swirl and the secondary swirls thereby to improve combustion efficiency.

18 Claims, 29 Drawing Figures

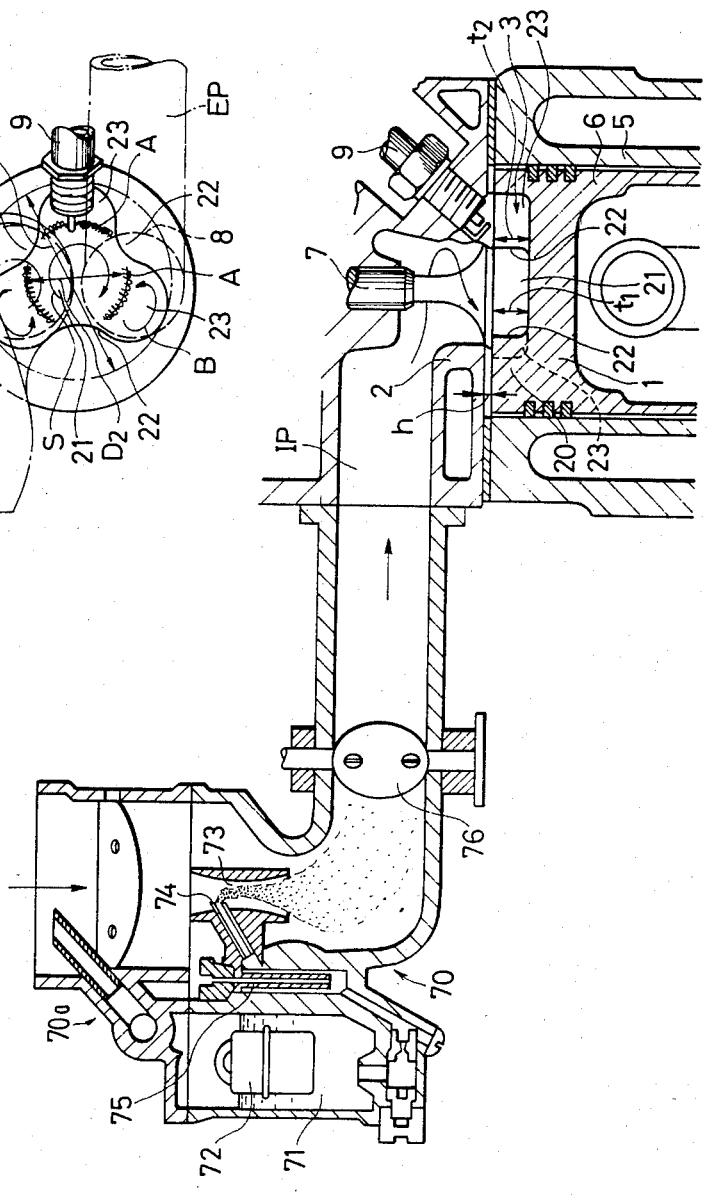
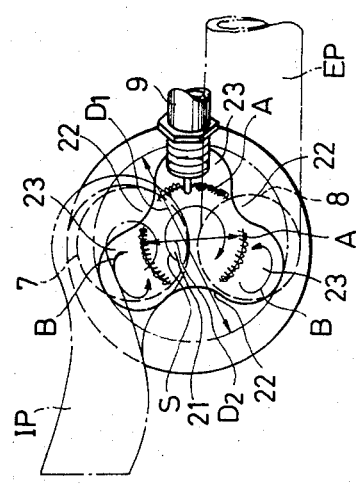
FIG. 5
FIG. 6

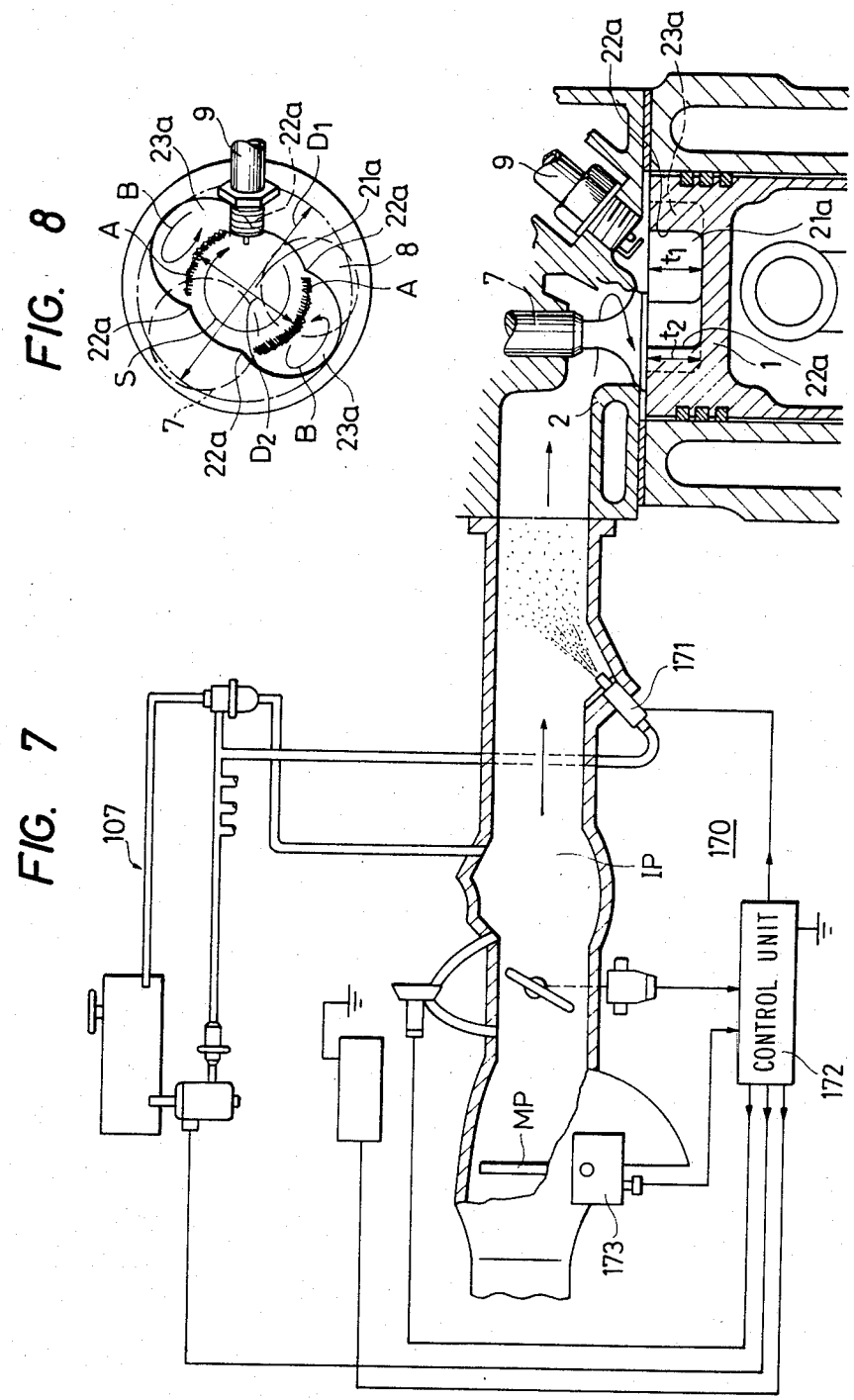

TURBULENCE GENERATING METHOD AND INTERNAL COMBUSTION ENGINE FOR CARRYING OUT THE SAME

BACKGROUND OF THE INVENTION

1. Field of the Invention

The present invention relates to a turbulence generating method making effective use of a swirl of intake air to efficiently generate turbulence to thereby improve the combustion efficiency of a reciprocating internal combustion engine, and an engine for effecting this method.

2. Description of the Prior Art

In order to improve combustion in a reciprocating piston internal combustion engine to thereby improve fuel economy and the output power, and to reduce the noxious content of the exhaust gas, it is most important to increase the flow velocity of the gas in the combustion chamber to thereby augment turbulence. If this is satisfied, the burning velocity can be increased to shorten the time period for combustion.

In order to augment fluid turbulences with a view to achieving this object, according to the prior art, the following three methods have been conceived and carried out:

(1) intensifying the squish;
(2) intensifying the intake swirl; and
(3) combining the intake swirl and the squish.

In the so-called "premixed type internal combustion engine" such as a spark ignition type internal combustion engine for injecting fuel into an intake port or an intake pipe or a spark ignition type internal combustion engine using a carburetor, in order to raise the compression ratio to improve the fuel economy, it is necessary to intensify the turbulence in order to raise the flame propagation velocity to thereby shorten the combustion period, so that combustion may be completed before knocking occurs.

For this purpose, according to the first method, a combustion chamber 3 which is defined by the top face of a piston 1 and a cylinder head 2 is formed at a portion with a recess 4, as shown in FIG. 1, so that an intense squish (as indicated by arrows) may be generated immediately before top dead center as the piston 1 rises.

According to the second method, there is provided a mechanism for generating a swirl in the intake air-fuel mixture, e.g., a shrouded intake valve, a tangential intake port or a helical port, to generate a swirl during the intake stroke so that turbulence may be intensified by the swirl remaining during the compression stroke.

The third method combines the preceding two methods.

The relationship between heat release and crank angle in each method, as examined by use of a pressure indicator attached to the combustion chamber to measure pressure change, is illustrated in FIG. 2.

Although the second method making use of the swirl provides faster combustion (the combustion is faster for larger gradients in FIG. 2) than any method using neither swirl nor squish, the turbulences generated during the suction stroke are soon attenuated when using only the swirl generated during the intake stroke, and only a swirl is left to provide a weak combustion promoting effect.

Next, according to the first method making use of squish, the squish flow velocity is maximum about 10 degrees before the top dead center (TDC) position of the piston, and the squish itself is then abruptly attenuated so that the combustion is relatively fast from the initial stage to the intermediate stage of combustion, as shown in FIG. 2. However, the turbulence generation disappears with the attenuation of the squish so that the latter half of the combustion is not fast. Since the third method employs a recess in a portion of the piston top face to use both the squish flow and the intake swirl, as shown in FIG. 4, the swirl in the recess is intensified to the extent corresponding to the difference in diameter between the cylinder and the recess in the vicinity of top dead center to effect the fastest combustion in FIG. 2 by combining the swirl and squish effects. As has been described above, however, the squish flow is quickly attenuated so as to exhibit no combustion promoting effect at the latter half stage of combustion.

As has been described above, the swirl has no considerable effect, but the squish or its combination with the swirl accelerates the burning velocity. However, this combustion promoting effect is obtained only at the initial stages of combustion. In order to intensify the squish, on the other hand, the clearance between the piston and the lower surface of the cylinder head at TDC has to be no more than 1 mm, so that the heat loss at that portion is increased and the thermal efficiency is decreased.

Thus, the burning velocity cannot be accelerated over the whole range of the combustion period by any of the above methods. There also arises a problem in that the compression ratio cannot be made sufficiently high without inviting knocking. At the present technical level, the compression ratio is limited to 9 to 9.5 at the highest for an engine cylinder diameter of 80 to 90 mm and a fuel octane number of 90.

On the other hand, the aforementioned third method is used in either a direct injection stratified charge engine which is equipped with a fuel injection valve in the combustion chamber and with ingniting means such as a spark plug, or in a direct injection type Diesel engine which is equipped with a fuel injection nozzle in the combustion chamber, and in which the compression ratio is raised until spontaneous ignition.

In the former engine, the fuel is injected during the intake stroke and to about 60 degrees before TDC to provide the homogeneous combustion whereas, in the latter engine, the fuel is injected during the period 60 degrees before and at TDC. Since the fuel is injected directly into the combustion chamber in either case, the intake air is cooled down by the latent heat of evaporation, or combustion is started at the instant when the air and the fuel are mixed so that a high compression ratio can be employed without the danger of knocking, unlike the spark ignition type internal combustion engine using a carburetor.

However, the combustion chambers of these engines are formed with a recess in the piston and with an intake port for generating a swirl during the intake stroke to effect turbulence generation by the aforementioned third method. As has been described hereinbefore, intense turbulences are generated immediately before TDC to promote the mixing of the air and the fuel. However, the turbulence intensity is too quickly attenuated to promote combustion after TDC, i.e., the intermediate stage of combustion, to fail to accelerate combustion at the latter half thereof, as shown in FIG. 2, so that even a rise in the compression ratio will not lead to a significant improvement in the fuel economy. Since the fuel is injected directly into the combustion chamber, moreover, the hydrocarbons, i.e., HC left unevaporated, are liable to be emitted. In the direct injection type Diesel engine, on the other hand, the fuel injection at maximum is started at 20 to 10 degrees before TDC and is ended at TDC to about 10 degrees after TDC, whereas combustion is started at 10 to 5 degrees before TDC and is ended at 40 to 50 degrees after TDC. In other words, the latter half of the fuel injection is conducted after combustion has already been started. Since the compression ignition type direct injection (i.e., Diesel) engine also uses the third method in which both the swirl generated during the suction stroke and the squish generated by forming the piston with a recess (e.g., of shallow or deep dish shape or of troidal or ball-in shape) are used, it is advantageous for the purpose of the dispersion of the fuel at the preparation of the mixture, especially, the initial mixture preparation. For mixture preparation around or after TDC or after the intermediate stage of combustion, however, the turbulence intensity is insufficient to cause a deterioration of fuel economy or the generation of smoke.

SUMMARY OF THE INVENTION

The present invention has been conceived to solve the aforementioned problems concomitant with the prior art, and has an object of providing both a turbulence generating method for a reciprocating internal combustion engine, by which the swirl in the intake air is effectively utilized to efficiently generate and ensure turbulence, so that combustion, especially at and after the intermediate stage thereof, is accelerated by the existence of such turbulences to shorten the combustion period, to thereby improve combustion efficiency, and a reciprocating internal combustion engine for carrying out said method.

Another object of the present invention is to provide a premixed spark ignition type internal combustion engine which can reduce knocking, to realize a high compression ratio and to reduce the fuel consumption rate.

Still another object of the present invention is to provide a direct injection engine having ignition means, which can shorten its combustion period, to reduce the fuel consumption rate and to reduce the emission of hydrocarbons (HC).

A further object of the present invention is to provide a compression ignition type direct fuel injection (or Diesel) internal combustion engine in which the air-fuel mixture is prepared by intense turbulence, to enhance the air utilization factor at the latter half of the injection period, to thereby reduce the generation of smoke and to reduce the fuel consumption rate, as a result of a shortening of the combustion period.

In order to achieve these objects, the inventors have invented both a method for continuing the turbulence generation during the combustion period and an internal combustion engine for carrying out that method. The inventors have found that conventional turbulence generation is concentrated within a limited period and is not continued over the whole combustion period, and that the generation of flows and turbulence are high only during the preparation of the mixture before the combustion and are insufficient during the intermediate and latter stages of combustion in an engine in which fuel is injected directly into the cylinder by a fuel injection nozzle.

According to a first aspect of the present invention, there is provided a turbulence generating method for a reciprocating internal combustion engine, in which there are provided a combustion chamber defined by a piston, a cylinder head and a cylinder block, main and auxiliary recesses provided in said combustion chamber, said main and auxiliary recesses being connected through at least two projected portions (i.e. turbulence lips or portions projected as viewed from the auxiliary recess);

an intake mechanism for supplying intake air into said combustion chamber, including a swirling mechanism for swirling intake air, comprising the steps of generating a swirl of intake air in said main recess by said swirling mechanism and accelerating said swirl in said main recess as said piston rises;

forming a turbulent layer while occasionally converting said swirl into turbulences using said projected portions;

generating secondary swirls different from said swirl in said auxiliary recesses; and further generating turbulences between said swirl and said secondary swirls to thereby improve combustion efficiency.

According to this aspect of the invention, the swirl of the intake air, which has been generated during the intake stroke of the internal combustion engine by a swirling mechanism (such as the masked intake valve or the helical intake port), is properly introduced into the main recess to flow stably and smoothly in accordance with the rise of the piston so that said swirl is effectively utilized to form an intensely turbulent layer while being efficiently converted into turbulences by said lands.

Moreover, the secondary swirls, different from the aforementioned swirl, are generated in said auxiliary recesses so that turbulences can be further generated between said swirl and said secondary swirls.

Those turbulences are generated by making effective use of the swirls and can be continuously generated without exerting adverse influence upon the swirls until these swirls are attenuated so that they can continue for a long time not limited to a predetermined period.

Thanks to the generation and continuation of those turbulences, there can be attained a remarkable effect in that the subsequent combustion can be promoted to shorten the combustion period, to thereby improve remarkably the combustion efficiency.

According to the turbulence generating method of the invention, therefore, there can be attained a number of practical effects: desirable intensive turbulence can be reliably generated in a suitable portion of the main recess by making effective use of the swirl; the generation of turbulence is ensured; and a variety of performance characteristics are improved by the interactions between the swirls and the turbulences. Since the invention does not make use of the squish flow, more specifically, the top clearance h (which is defined as the clearance between the top face of the piston and the cylinder head at TDC) may be enlarged. In a conventional premixed spark ignition type high squish engine, the top clearance h should be less than 1.0 to 1.5 mm, which in the present invention it may be more than 1.5 mm which hardly causes squish flow. This is advantageous in the production of the engine. Another excellent effect is that no increases in the emission of HC and heat loss are invited by the quenching action. That is to say, any flame is prevented from entering the top clearance. Thereby, the wall temperature is reduced at TDC by the quenching action for a small value of the top clearance h. For the premixed spark ignition type internal combustion engine or a stratified charge type internal combustion engine having a compression ratio of not more than 12, more specifically, the top clearance h is preferred to be not less than 1.2 mm, and performance is optimized if it is within a range of 1.5 to 2.0 mm. In the compression ignition type internal combustion engine and the stratified charge engine having a higher compression ratio, on the other hand, the top clearance h used in not more than 0.6 mm so as to procure the compression ratio. According to this aspect of the invention, moreover, the turbulence is not generated by the squish flow so that its generation does not depend upon the piston speed but is facilitated even in low speed engine operating conditions, in which an intense squish is hard to generate. Thereby the fuel economy is effectively improved and exhaust emissions are decreased at low speed.

According to this aspect of the invention, moreover, the large value of the aforementioned top clearance h invites an effect such that the cooling loss is so low as to not produce deterioration of the fuel economy during a partial load operation. If the piston is formed with the main recess and the auxiliary recesses, the temperature at the piston top face becomes higher than that of the surrounding portion of the combustion chamber and the lower face of the cylinder head. As a result, the provision of the main and auxiliary recesses in the piston will cause less heat loss from the wall than the case in which these recesses are formed in the cylinder head or in the cylinder block, to thereby remarkably reduce the heat loss.

According to a second aspect of the present invention, moreover, there is provided a reciprocating internal combustion engine, comprising:

a combustion chamber defined by a piston, a cylinder head and a cylinder block, an intake mechanism for supplying intake air into the combustion chamber, including a swirling mechanism for swirling the intake air, the combustion chamber being formed with a main recess for introducing and accelerating the swirl of the intake air, which is generated by the swirling mechanism, the main recess being formed with at least two projected portions for forming a turbulent layer while occasionally converting the swirl into turbulences, the main recess being formed with auxiliary recesses for generating secondary swirls different from the first swirl to accommodate and allow the same to flow therein and for further generating turbulences between the first swirl and the secondary swirls to thereby improve the combustion efficiency of the internal combustion engine.

According to the internal combustion engine of the second aspect of the invention thus constructed, the swirl of the intake air, which has been generated by the swirling mechanism, is introduced into the main recess of the combustion chamber and is accelerated and allowed to flow stably and smoothly therein in accordance with the rise of the piston, and the main recess is formed with at least two lands so that the swirl is effectively utilized, without exerting such adverse influence as will attenuate the swirl, and can be occasionally converted into turbulences to thereby form an intensely turbulent layer.

Moreover, the internal combustion engine of this aspect of the invention forms specified portions of the main recess with auxiliary recesses communicating with the former to generate the secondary swirls other than the aforementioned swirl in the auxiliary recesses and to properly promote the swirling flow, while accommodating the same, to thereby contribute to the swirling force of the swirl in the main recess and to further generate turbulences between the first-named swirl and the secondary swirls.

As a result, the internal combustion engine of this aspect of the invention can enjoy remarkably excellent results in practice: turbulence can be generated reliably in the main recess by making effective use of the swirl; the generation of the turbulence can be continued; and the subsequent combustion can be accelerated by the additional interactions between the swirl and the turbulences to remarkably shorten the combustion period to remarkably improve combustion efficiency.

The internal combustion engine of the second aspect of the invention can enjoy the operational effects similar to those of the first aspect of the invention.

According to mode 1 of the second aspect of the invention, there is provided a reciprocating internal combustion engine of the premixed spark ignition type further comprising a fuel supply device disposed in the intake mechanism and including a carburetor or a fuel injection valve for supplying a predetermined amount of fuel to the intake air to prepare an air-fuel mixture to thereby spark-ignite and burn the mixture in the combustion chamber at a predetermined timing.

According to mode 2 of the second aspect of the invention, there is provided a reciprocating internal combustion engine of the into-cylinder fuel injection type further comprising a fuel supply device disposed in the combustion chamber and including a fuel injection valve having communication with a fuel supply source for injecting and supplying a predetermined amount of fuel directly into the combustion chamber; and an ignition device for igniting and burning the fuel injected and supplied to thereby ignite and burn the fuel which is injected and supplied directly into said combustion chamber.

According to mode 3 of the second aspect of the invention, there is provided a reciprocating internal combustion engine of the compression ignition and direct fuel injection type further comprising a fuel supply device disposed in the main recess of the combustion chamber and including a fuel injection valve having communication with a fuel supply source for injecting and supplying a predetermined amount of fuel directly into the main recess to compress the intake air adiabatically, as the piston rises, to thereby compress, ignite and burn the fuel which is injected and supplied directly into the main recess.

According to the internal combustion engine of any mode of the second aspect of the invention, the swirl of the intake air, which is generated by the swirling mechanism, is exactly accommodated, as the piston rises, and properly swirled and accelerated in the main recess of the combustion chamber so that it is allowed to flow stably and smoothly therein, and the swirl is utilized effectively without any attenuation by the projections, which are formed in the main recess, so that it can be occasionally converted, in a suitable portion of the main recess, into turbulences to form an intensely turbulent layer. According to the internal combustion engine of the second invention, moreover, the main recess is formed at its predetermined portion with auxiliary recesses communicating therewith so that secondary swirls other than the aforementioned swirl can be generated in the auxiliary recesses and accommodated to promote their swirling flows and so that turbulences can be further generated between the aforementioned swirl and the secondary swirls.

As a result the internal combustion engine according to any of the modes of the second aspect can enjoy the effects that the swirl can be effectively utilized in the main recess to generate turbulences without fail while continuously ensuring turbulence generation, and that the subsequent combustion can be accelerated by the additional interaction between the swirl and the turbulences to shorten the combustion period to improve the combustion efficiency.

As a result, the internal combustion engine according to the second aspect of the invention can reduce knocking, if it is of the premixed spark ignition type (mode 1), to realize a high compression ratio to thereby reduce the fuel consumption rate. On the other hand, the direct injection type internal combustion engine having igniting means (mode 2) can shorten the combustion period to reduce the fuel consumption rate and HC emissions. In addition, the compression ignition type direct fuel injection (or Diesel) internal combustion engine (mode 3) can prepare an air-fuel mixture using the intense turbulences to enhance the air use factor of the fuel during the latter half of the injection period, to reduce smoking and the fuel consumption rate while shortening the combustion period, thus enjoying practically excellent operational effects.

In addition, the internal combustion engine according to modes 1 to 3 of the second aspect of the invention can enjoy operational effects substantially similar to those described with respect to the foregoing method of the first aspect.

According to mode 4 of the second aspect of the invention, there is provided a reciprocating internal combustion engine, wherein the number of said projections is not less than 2 and not more than 6.

According to mode 5 of the second aspect of the invention, moreover, there is provided a reciprocating internal combustion engine, wherein the ratio of the distance $D_2$ between the facing sides of said projections to the distance $D_1$ between the facing sides of the auxiliary recesses is preset to satisfy the following relationship:

$$0.9 \geq D_2/D_1 \geq 0.5$$

According to mode 6 of the second aspect of the invention, furthermore, there is provided a reciprocating internal combustion engine, wherein the main recess and the auxiliary recesses are arranged in the top of said piston, and wherein the ratio of the depth $t_2$ of the auxiliary recesses taken in the axial direction of the piston to the depth $t_1$ of the main recess taken in the axial direction of the piston is preset to satisfy the following relationship:

$$1.4 \geq t_2/t_1 \geq 0.4$$

The internal combustion engine according to any of modes 4, 5 and 6 can enjoy the following operational effects in addition to effects substantially similar to those of the foregoing described internal combustion engine according to the second aspect of the invention. In the internal combustion engine according to modes 4, 5 and 6, the continuation of the aforementioned turbulence generation is determined, if the distance $D_1$ between the facing sides of the auxiliary recesses is the same, by the shape and construction of the projections and by the size of the auxiliary recesses, so that it is determined by the number of projections and by the ratio of the distance $D_2$ of the facing sides of the projections to the distance $D_1$ between the facing sides of the auxiliary recesses.

As a result, the continuation of the turbulence required for accelerating combustion extends from ignition to the end of combustion, and its time period is expressed by 40 to 60 degrees in terms of the engine crank angle. If turbulence generation continues longer, the heat transfer between the burned hot gases and the wall becomes efficient to cause an increase in the heat loss.

A suitable scale of the turbulences is necessary for accelerating the combustion, in other words, for accelerating the flame propagation. As to the turbulence scale, the swirl is converted into finer vortexes by the projected portions (i.e., the turbulence lips). Namely, the turbulent layer contains intrinsically large swirls and fine vortexes included therein. As a result, remarkable effects on accelerating the combustion cannot be expected if the scale is excessively small or excessively large. The quality, i.e., the scale of the turbulence, is determined by the shape and number of the projected portions (i.e., the turbulence lips) and accordingly by the aforementioned ratio of the distance $D_2$ to the distance $D_1$.

The inventors have conducted a number of experiments and have determined, for the gasoline engine shown in FIG. 5, that the ratio $D_2/D_1$ of about 0.75 is the best for turbulence lips of n equal to about 4 and the cylinder diameter of about 80 to 90 mm. For the ratio of $D_2/D_1 > 0.9$, the turbulence intensity is too low and their continuation is excessively long, and the turbulences are so excessively strong for the ratio $D_2/D_1 < 0.5$ that blow-off takes place in the initial ignition or the continuation becomes excessively short.

In mode 6 of the second aspect of the invention, moreover, as in one later-described embodiment shown in FIG. 14, the auxiliary recesses, which are formed between the inscribed circle $D_2$ inscribed by the projections and the circumscribed circle $D_1$ circumscribed by the auxiliary recesses, are most desired to have a depth equal to that of the main recess in the inscribed circle. Even if the auxiliary recesses between the inscribed circle and the circumscribed circle are more or less shallow or deep, however, an annular turbulent layer can be formed in the inscribed circle, as has been described hereinbefore, so long as the difference in the depth is within the range of $1.4 > t_2/t_1 > 0.4$. In order that the valves of the cylinder head may be prevented from colliding with the piston top face when they are opened and closed, moreover, a relief may be formed in the piston top face. If the auxiliary recesses between the inscribed circle and the circumscribed circle are used effectively as that relief, separate recesses need not be formed merely for valve relief so that the spare volume can be reduced to facilitate the design at a sufficiently high compression ratio.

Thus, the internal combustion engine according to modes 4, 5 and 6 can enjoy good operational effects such that proper generation and continuation of turbulences can be attained, if the parameters and relationships as have been described above are satisfied.

BRIEF DESCRIPTION OF THE DRAWINGS

Other objects, features and advantages of the present invention, will become apparent from the following description taken in conjunction with the accompanying drawings, in which:

FIGS. 5 and 6 are sectional views showing a gasoline engine with a carburetor according to one embodiment of the present invention;

FIGS. 7 and 8 are sectional views showing a gasoline engine with an intake pipe injection according to another embodiment of the present invention;

DETAILED DESCRIPTION OF THE PREFERRED EMBODIMENTS

Figure 1:
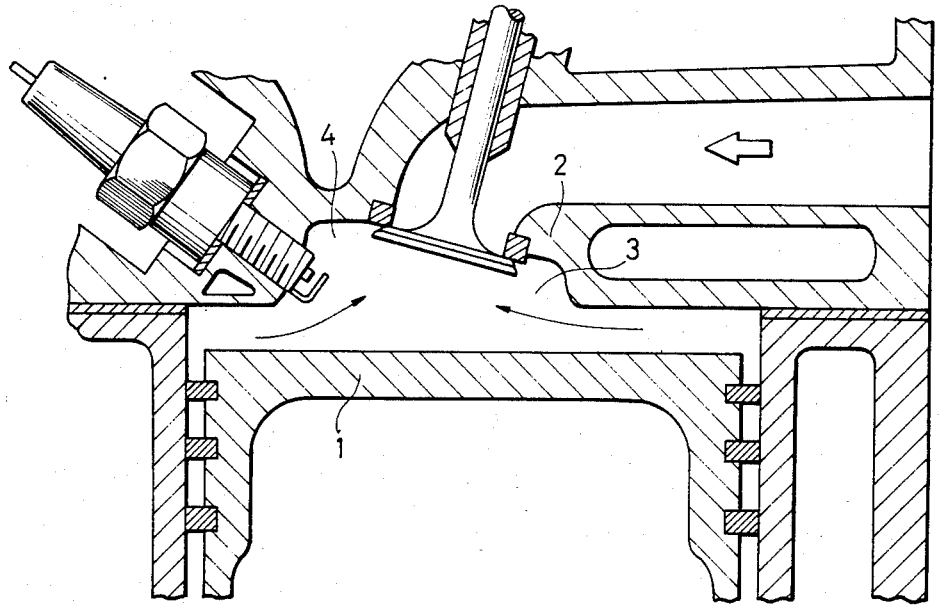
FIGS. 1 to 4 show a longitudinal section of a gasoline engine according to the prior art, and analytical data thereof.
Figure 2:
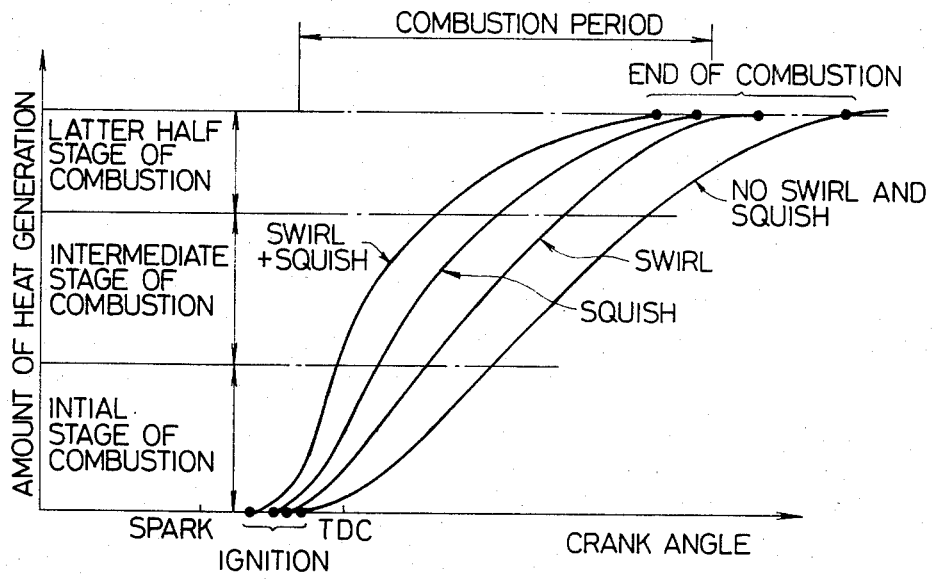
Figure 3:
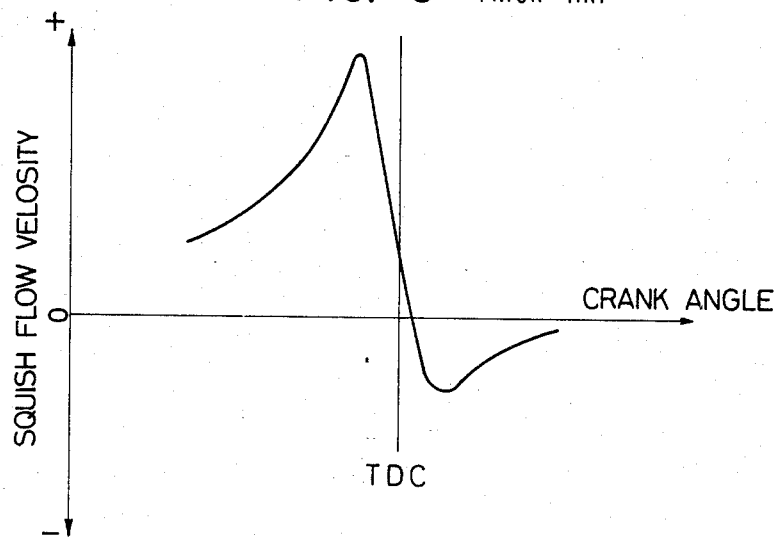
Figure 4:
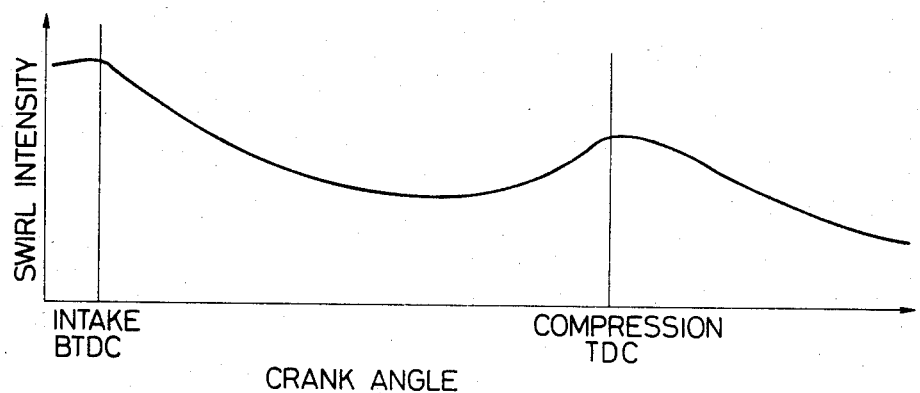

The embodiment shown in FIGS. 5 and 6 is directed to both a turbulence generating method for a piston type gasoline engine with a carburetor as one of premixed spark ignition type reciprocating internal combustion engines, and a gasoline engine for carrying out the turbulence generating method, which belongs to the first aspect of the invention and modes 1, 4, 5 and 6 of the second aspect of the invention.

In a cylinder bore 6 formed in a cylinder block 5, there is fitted a piston 1 which is retained on a crankshaft through a connecting rod so that it may be reciprocated within said cylinder bore. The piston 1 has its upper portion 20 formed with both a main recess 21 having a cross-section of a true circle and three auxiliary recesses 23 having such arcs as communicate with the main recess 21 through three arcuate projections 22 and which have a larger curvature than that of the projections 22. The main and auxiliary recesses 21 and 23 thus formed have a predetermined equal depths $t_1$ and $t_2$, as is seen from the longitudinal section. The cylinder head 2 fixedly placed on the upper portion of the cylinder block 5 has its lower portion formed with an intake passage IP and an exhaust passage EP which are opened into the combustion chamber 3. In the two openings of the intake and exhaust passages IP and EP, respectively, there are arranged an air-tight intake valve mechanism 7 and an exhaust valve mechanism 8 having a longitudinal section of an inverted "T", which are reciprocated vertically by respective cam shafts associated and synchronized with the crankshaft. Moreover, the intake passage IP is formed with a helical intake port as a swirling mechanism for imparting a swirl to the intake air supplied into the aforementioned main recess 21 of the combustion chamber.

An ignition device 9 has an ignition plug which is connected with an ignition circuit and which has its ignition point arranged to face the outer side of the outer circumference of the main recess 21 of the combustion chamber 3, to thereby ignite the gasoline therein.

Upstream of the intake passage IP, there is arranged an ordinary carburetor 70 which is equipped with both a nozzle 74 opened into a venturi 73 arranged in the intake passage and an air bleed 75 communicating with the aforementioned float chamber 71. Downstream of the venturi 73 and the bent portion of the intake passage IP, moreover, there is arranged a throttle valve 76 which is associated with an accelerator pedal. In the gasoline engine of the present embodiment, if the distance between the facing sides of the auxiliary recesses 23 is denoted at $D_1$ (which is shown as a circumscribed circle in the drawing) and if the distance between the facing sides of the projections 22 is denoted at $D_2$ (which is shown as an inscribed circle in the drawing), the ratio thereof ($D_2/D_1$) is preset to have a value of 0.75. Although the present embodiment is exemplified by a uniform mixture engine, the compression rate can be preset at as high as 11 because the continuation of turbulences is so long that the combustion period can be shortened with no knocking. Moreover, the top clearance h is preset at 2.0 mm. On the other hand, the electrode of the ignition plug is arranged rather outside of the inscribed circle so that it may be prevented from being attacked directly by the turbulences generated by the turbulence lips exemplified by the projections, to thereby prevent blow-off.

The operational effects of the piston type gasoline engine with the carburetor having the construction thus far described according to the present embodiment will be described in the following.

A fuel supply device 70a in the present embodiment is constructed of the carburetor 70 described above, and the mixture of the gasoline and air, which has been metered by the carburetor 70 and has passed through the helical intake port forming a part of the intake passage IP, is supplied in the form of a swirling flow S into the main recess 21 of the upper portion of the piston 1 in the combustion chamber 3 by way of the helical intake port IP and the intake valve 7 as the intake stroke starts and the piston 2 is moved down.

The swirl S under consideration is introduced into and accelerated in the main recess 21 in accordance with the rise of the piston 1 until it is allowed to flow in a swirling manner. Moreover, the swirl not only forms an intensely turbulent layer A, while being occasionally converted into turbulences by the actions of the aforementioned three projections 22, but also generates secondary swirls B different from the aforementioned swirl in the auxiliary recesses 23, respectively. More specifically, the secondary swirls B are generated and accommodated in the aforementioned auxiliary recesses 23 by the presence of both the aforementioned three projections 22 and swirls, and turbulences A are further intensely generated between the aforementioned swirl and the secondary swirls in the auxiliary recesses 23. The turbulences A are generated by making effective use of the swirl S, and their generation is continued without exerting adverse influences upon the swirl until this swirl is reduced so that the turbulences A are continued for a desired long time.

Thanks to the generation and presence of the turbulence, there can be attained remarkably excellent effect that the subsequent combustion can be promoted to shorten the combustion period, to thereby remarkably improve combustion efficiency.

Thus, the turbulence generating method of the present embodiment can enjoy good effects in that the proper turbulences A can be generated without fail in the suitable portion of the main recess 21 by making effective use of the swirl S with their generation being retained, and in that a variety of performances can be improved by the interactions between the swirl S and the turbulences A. More specifically, the present embodiment can enjoy excellent effects in that the top clearance h (i.e., the clearance between the top face of the piston 1 and the cylinder head 2 at TDC) may be enlarged (e.g., h is less than 1.0 to 1.5 mm for a high squish flow engine), because no squish flow is used, to the range of $h > 1.5$ mm, where the squish flow has little effect, so that an advantage can be obtained in engine production. No increase in the HC emission and in heat loss is caused by the quenching action (for a small h, no flame is allowed to enter there at TDC, resulting in lowering of the wall temperature) of that portion. According to the method of the invention, moreover, turbulence generation does not depend upon the piston velocity, because it is not generated by the squish flow, so that it is facilitated even in a low-speed running condition, in which an intense squish is hard to generate, thereby improving the fuel economy and exhaust emissions in a low speed running condition.

According to the invention, furthermore, since the aforementioned top clearance h is large, there can be attained another effect in that the cooling loss is too small to invite a deterioration in the fuel economy during a running condition under partial load.

Next, according to the gasoline engine of the present embodiment, the swirl S of the intake air generated by the swirling mechanism is introduced and accelerated properly into the main recess 21 of the aforementioned combustion chamber in accordance with the rise of the piston 1 and is allowed to flow stably and smoothly. At the same time, the swirl S is used effectively without being reduced by the three projections 22 formed in the main recess 21 so that it can be occasionally converted into turbulences in a suitable portion of the main recess 21, to thereby form the intensely turbulent layer A.

Moreover, the gasoline engine of the present embodiment can generate the secondary swirls B in the auxiliary recesses 23 formed as the specified portions of the main recess 21 and these swirls can be accommodated therein to promote the swirling flows to thereby further generate turbulences A between the swirl S and the secondary swirls B.

As a result, the gasoline engine of the present embodiment can enjoy remarkably excellent operational effects: the turbulences A can be generated reliably in the main recess 21 by making effective use of the swirl S; fuel evaporation can be promoted by continuing the turbulence generation; the concentration of the unburned mixture around the circumference of the main recess 21 can be prevented from becoming rich; and the mixture can be made uniform by the interactions between the swirl S and the turbulences A to accelerate the subsequent combustion to thereby remarkably shorten the combustion period, to reduce knocking, to realize a high compression ratio and to reduce the fuel consumption rate. In the present embodiment, the ignition device is arranged outside the circumferential edge of the main recess 21. The arrangement should not be limited thereto, as the ignition device may be arranged inside the circumferential edge of the main recess 21 to retard the initial combustion and to advance the combustion at the intermediate stage and thereafter to suppress knocking, thus enjoying operational effects substantially similar to those of the described embodiment.

Moreover, the piston type gasoline engine of the present embodiment can enjoy an advantage in that it can be easily put into practice, because it is sufficient merely to change the design of the shape of the upper portion of the piston.

Another embodiment will now be described on the basis of a piston type gasoline engine of the intake pipe fuel injection type, which is one of the premixed spark ignition type reciprocating internal combustion engines.

The piston type gasoline engine of the embodiment under consideration belongs to modes 1, 4, 5 and 6 of the second aspect of the invention, as described above, as shown in FIGS. 7 and 8, and is different from the engine of the foregoing embodiment in the following points: the intake passage IP is a tangential intake port for swirl generation which is equipped with an intake pipe injection device for injecting fuel; and the piston 1 is formed at its upper portion with both a main recess 21a (which is partially indicated by a broken line) having a true circular cross-section and auxiliary recesses 23a (indicated by solid lines) formed of arcs which communicate with the main recess 21a through two arcuate projections 22a, the auxiliary recess arcs having a larger radius than that of said projections 22a. The following description stresses the points different from the above device, and identical portions are indicated by identical reference characters and their explanations are omitted.

An intake pipe injection device 170 includes fuel supply means 107, which in the present embodiment is an electronic fuel injection device of the air flow metering type, which is composed of: an electromagnetic nozzle 171 for injecting gasoline obliquely from below the intake passage IP toward the inner wall of the intake passage IP; and air flow meter 173 for detecting the flow rate of air flowing through the intake passage IP in terms of the rotational displacement of a metering plate MP; and a control unit 172 made responsive to the signal coming from the air flow meter 173 for feeding the electromagnetic nozzle 171 with a signal for controlling the injection rate of the gasoline at each injection period in accordance with the running condition of the engine, while taking the ignition signal and the temperature of the engine cooling water into consideration.

The piston type gasoline engine having the construction thus far described according to the present embodiment supplies a mixture of gasoline and air, which has been metered by the electronic fuel injection device, in the form of a swirl, to the inside of the main recess 21a at the upper portion of the piston from the intake passage IP through the intake valve 5.

According to the gasoline engine of the present embodiment, the swirl S of the intake air, which is prepared by the tangential intake port IP acting as the swirling mechanism, can be properly introduced and accelerated into the main recess 21a of the aforementioned combustion chamber in accordance with the rise of the piston, and can be allowed to flow therein stably and smoothly, and the swirl S can be used effectively without any reduction by the two projections 22a, which are formed in the main recess 21a, and can be occasionally converted into turbulences to generate an intensely turbulent layer A.

Moreover, the gasoline engine of the present embodiment is abled to generate secondary swirls B different from the aforementioned swirl S in the auxiliary recesses 23, to promote the swirling flow of the swirls B, while accommodating the latter, and to further generate the turbulences A between the aforementioned swirl S and the secondary swirls B.

As a result, the gasoline engine of the present embodiment can enjoy excellent operational effects to remarkably improve combustion efficiency; the turbulences A can be reliably generated in the main recess 21a by making effective use of the swirl S with their generation being continued, and the subsequent combustion can be accelerated thanks to the interactions between the swirls and the turbulences to remarkably shorten the combustion period to thereby reduce knocking, to realize a high compression ratio and to reduce the fuel consumption rate.

Figure 9:
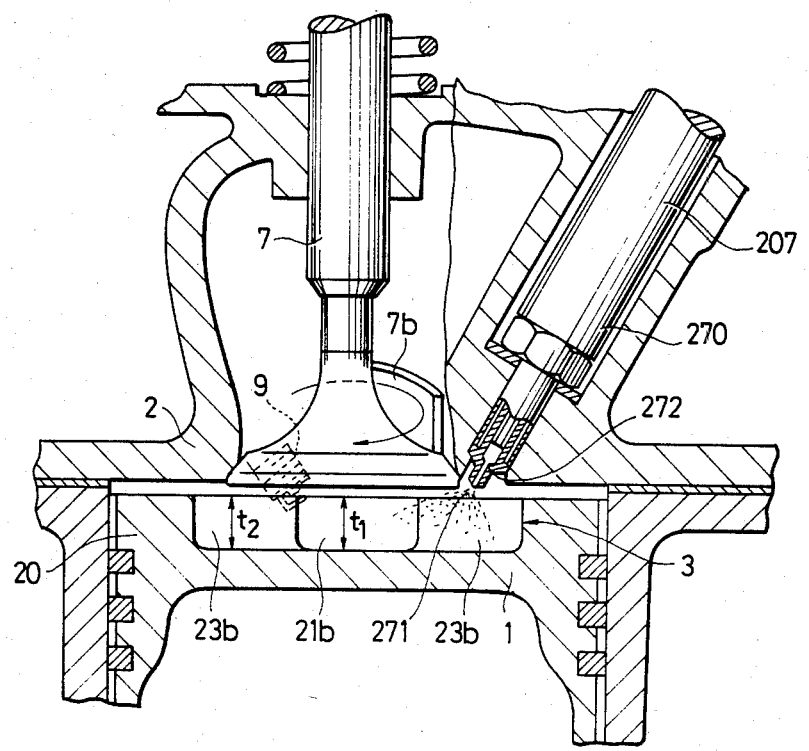
FIGS. 9 to 12 are sectional views showing a direct injection type gasoline engine according to still another embodiment of the present invention.
Figure 10:
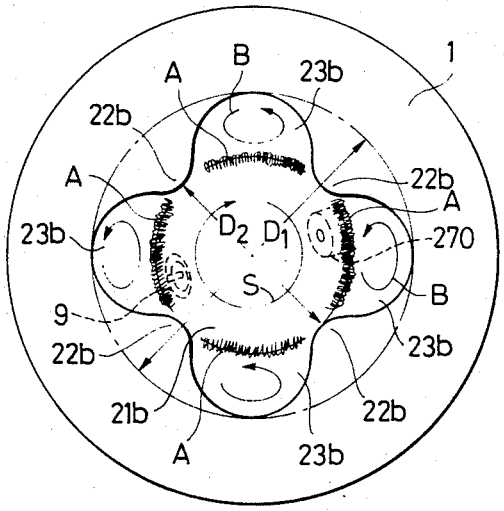

Next, another embodiment of the invention is directed to a direct fuel injection type internal combustion engine for injecting, into a main recess 21b of the combustion chamber, gasoline metered by a fuel injection nozzle, as shown in FIGS. 9 and 10, and belongs to types 2, 4, 5 and 6 of the present invention. The following description will stress the points different from the aforementioned embodiments, and identical portions will be indicated by identical reference characters.

The fuel supply means 207 of the piston type gasoline engine according to the present embodiment is composed of a swirl injection nozzle 270 extending through the cylinder head 2 and having its injection port 271 exposed to the inside of the combustion chamber 3; an air flow meter for detecting the flow rate of the intake air into the intake passage IP similarly to the aforementioned embodiment; a tachometer for detecting the r.p.m. of the engine; a control unit made receptive of signals indicating the aforementioned intake air flow rate and engine r.p.m. for generating a signal for controlling the injection rate of the gasoline in accordance with the running condition of the engine while taking the temperature of the engine cooling water into consideration; and a fuel supply device for feeding the injection nozzle with the gasoline under pressure at a flow rate corresponding to this control signal.

The swirl injection nozzle 270 tangentially introduces the gasoline under pressure at a predetermined flow rate from the fuel supply device through the communication port into a swirl chamber 272 to generate an intense swirl in the swirl chamber to thereby inject gasoline in the form of a thin film at a large spray angle from the injection port 271 into the main recess 21 at the top portion 20 of the piston 2.

The intake valve 7 acting as the intake mechanism is formed with a shroud 7b for generating a swirl in the intake air.

The piston type gasoline engine according to the present embodiment is formed with both a main recess 21b having a true circular cross-section at the upper portion 20 of the piston 1, as shown in FIG. 10, and auxiliary recesses 23b formed as four arcs communicating with the main recess 21b through four arcuate projections 22b and which have a larger curvature than that of the projections 22b.

The piston type gasoline engine having the construction thus far described according to the present embodiment uses a swirl injection nozzle, which has more advanced injection than the injection timing experienced in the Diesel engine and which has a relatively larger angle of dispersion and excellent atomization, so that the fuel spray diverge substantially over the entire inscribed circle $D_2$. By the action of the intake swirl S generated by the shroud 7b of the intake valve 7, moreover, the fuel spray swirls, and, when the piston approaches TDC, the intense swirl of the fuel and air flows, while being evaporated and mixed, into the main recess 21b at the upper portion of the piston so that turbulences are generated by the turbulence lips formed by the four projections 22b. The ignition occurs immediately before TDC to ensure fast combustion. In the present embodiment, incidentally: $D_2/D_1=0.7$; $\epsilon=13$ to 15; and the top clearance h=2.0.

Moreover, the gasoline engine of the present embodiment can enjoy operational effects such that high efficiency combustion can be effected, the fuel consumption rate can be improved, and an unburned detrimental exhaust content such as hydrocarbons can be prevented from being emitted. In addition, the gasoline engine of the present embodiment can enjoy operational effects similar to those of the foregoing embodiments.

Still moreover, the piston type gasoline engine of the present embodiment has advantages in that it can inject a liquid film of gasoline into the main recess 21b at the top portion 20 of the piston 1 from the most proper position at the most proper angle to thereby effect homogeneity by the swirl S of the intake air, and in that gasoline can be directly supplied to the combustion chamber to eliminate the defect of the gasoline's remaining in the intake passage, while enjoying excellent engine response.

The piston type gasoline engine of the present embodiment adopts a swirl injection nozzle 270 as the fuel injection nozzle, but any injection nozzle can be applied if it has a wide angle of injection. Thus, the gasoline engine of the present embodiment can use an injection nozzle of the types, for example, as shown in FIGS. 11 and 12.

Figure 11:
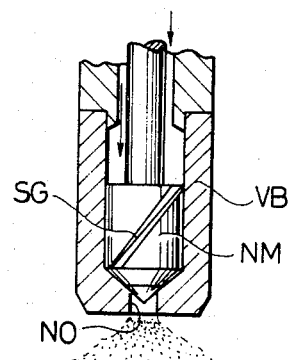

More specifically, the injection nozzle shown in FIG. 11 is of the slit type, in which a nozzle member NM fitted in a valve body VB is formed at its outer circumference with a spiral groove SG and in which gasoline is introduced helically and subjected to a centrifugal force so that it may be injected in the form of a thin film from a nozzle outlet NO at a large angle of spray.

Figure 12:
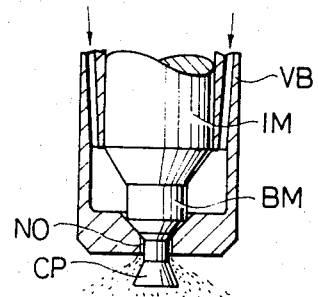

On the other hand, the injection valve shown in FIG. 12 is the so-called "collision nozzle38 , in which the gasoline is injected from the nozzle outlet to collide a collision plate CP secured through a bar member BM to an inner member IM fitted in the valve body VB, whereby its direction is changed by the collision plate CP, so that the gasoline is injected in the form of a thin film at a large spray angle.

Figure 13:
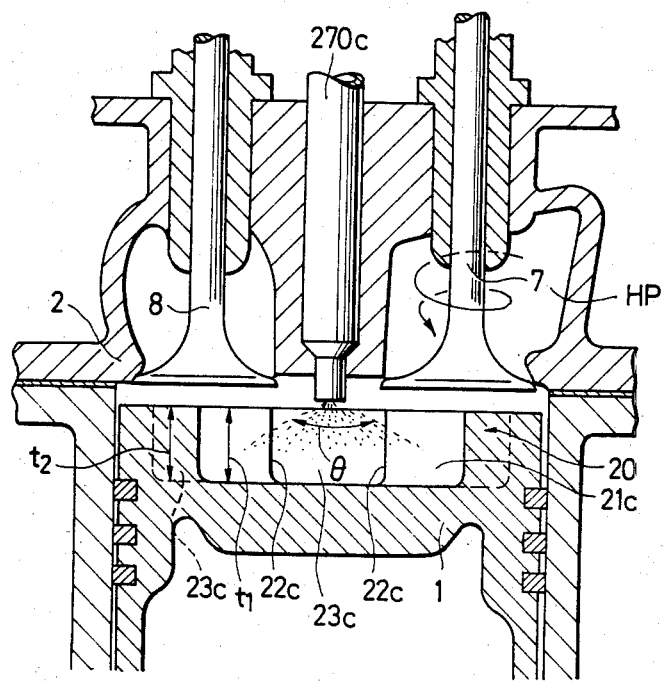
FIGS. 13 and 14 are sectional views showing a Diesel engine according to a further embodiment of the present invention.
Figure 14:
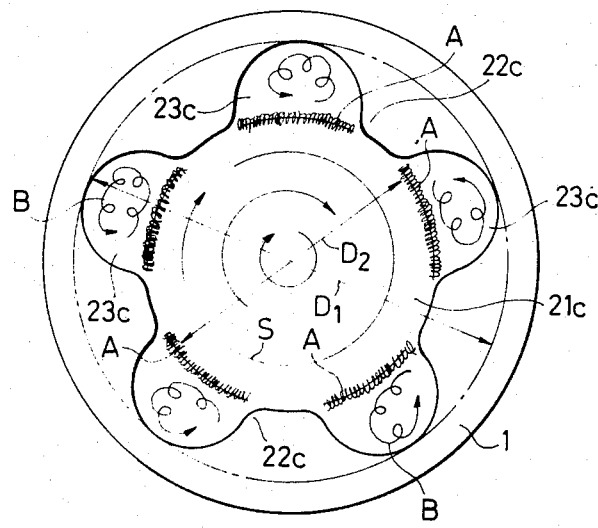
Figure 15:
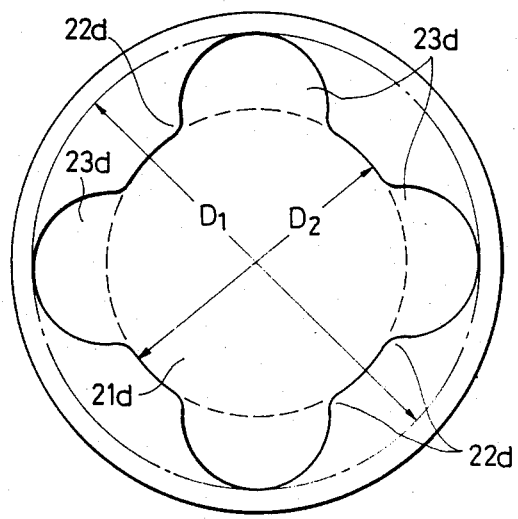
FIGS. 15 to 18, 19(a), 19(b), 20(a), 20(b), and 21 are schematic views showing, respectively, modifications of the present invention.
Figure 16:
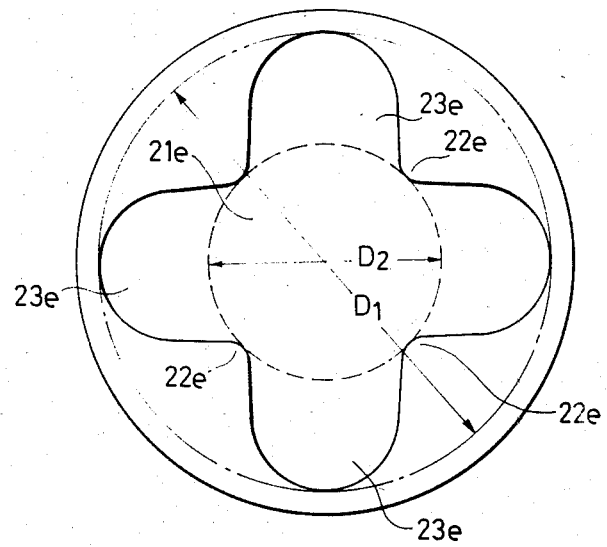
Figure 17:
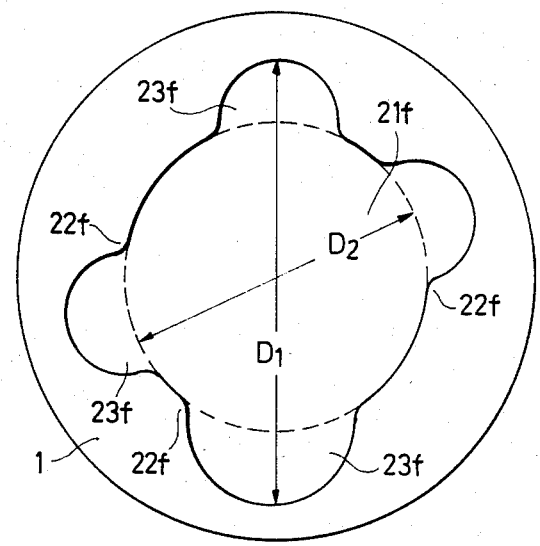
Figure 18:
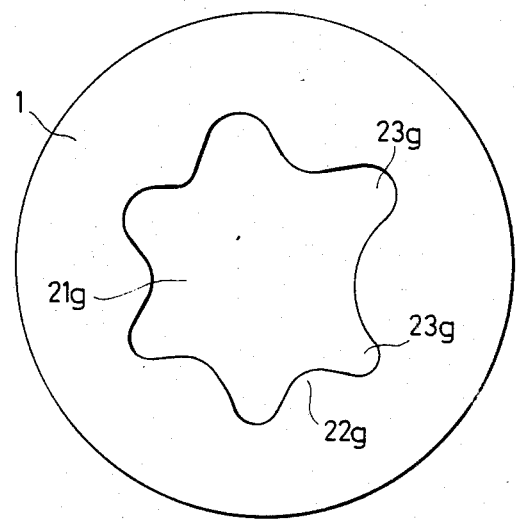

A further embodiment will now be described with respect to a compression ignition type direction injection (or Diesel) internal combustion engine, as shown in FIGS. 13 and 14, which belongs to modes 3, 4, 5 and 6 of the present invention. The Diesel engine of the present embodiment is characterized in that a properly controlled swirl is generated in the combustion chamber so that the spray is injected toward the vicinity of the inner wall of the opening of the main recess 21c from a fuel injection nozzle arranged on the central axis of the main recess 21c. The piston 1 is formed at its upper portion 20 with both the main recess 21c having a true circular cross-section and auxiliary recesses 23c formed of five arcs communicating with the main recess 21c through five arcuate projections 22c and which arcs have a larger curvature than that of the projections 22c.

The Diesel engine of the present embodiment is constructed, as shown in FIGS. 13 and 14, such that the main recess 21c of bottomed cylindrical shape forming the combustion chamber is formed at the central portion of the flat face of the top portion 20 of the piston 1 which is adapted to reciprocate within the cylinder block.

In the present example: $D_2/D_1=0.67$; $\epsilon=18$; and the top clearance h=0.8 mm.

The fuel injection nozzle is constructed, as shown in FIG. 11, of a slit type swirl injection nozzle 270c which is arranged to extend through the cylinder head 2 and to have its injection port aligned with the axis of the aforementioned main recess 21c.

The swirl injection nozzle 270c has its angle, effective area and slit length, its swirl chamber size, and the radius and length of its injection port determined so that the extension angle $\theta$ of fuel spray shown in FIG. 13 may be 60 to 120 degrees while forming a spray pattern of a hollow cone. The diameter of the injection port is found to be proper at 0.3 mm to 1.0 mm by our experiments and is set at 1.0 mm in the present embodiment. On the other hand, the solid conical angle $\beta$ of the thickness of the fuel spray of the hollow cone cannot be selected to have a large value but must be within a range of 5 to 35 degrees.

In the cylinder head 2, as shown in FIG. 13, there are arranged an intake valve 7 and exhaust valve 8 which surround the swirl injection nozzle 270c.

The intake passage, in which the intake valve 7 is arranged, forms a helical port HP which is tuned to generated a swirl having a predetermined swirl ratio.

In the Diesel engine having the construction thus far described according to the present embodiment, the intake air swirled by the helical port HP is compressed as the piston 1 rises.

In accordance with this rise of the piston 1, the swirl S of the intake air is accelerated and introduced into the main recess 21c until it has a proper swirling velocity.

Thus, the swirl S can be used effectively without any reduction by the projections 22c, which are formed in the main recess 21c, and can be occasionally converted into turbulences to form the intensely turbulent layer A.

In the Diesel engine of the present embodiment, moreover, the auxiliary recesses 23c can generate the five secondary swirls B and can accommodate them to promote their swirling flows and to further generate the turbulences A between the aforementioned swirl S and secondary swirls B.

Moreover, when the piston 1 comes close to TDC, i.e., from 20 to 5 degrees before TDC, the fuel injection is begun in the three-dimensional spray pattern of a hollow cone having a tangential velocity component and a large extension angle of spray from the swirl injection nozzle 270c, so that the spray reaches the vicinity of the inner wall of the opening of the main recess 21c.

When the piston comes to about 10 degrees before TDC, the fuel spray in the vicinity of the inner wall in the main recess 21c of the piston 1 are carried in the depthwise direction of the main recess 21c by the aforementioned swirl S and are diffused and mixed by the additional actions of the aforementioned turbulences A so that a proper mixture is prepared in the full volume of the main and auxiliary recesses 21c and 23c, while being evaporated by the hot air compressed adiabatically at the end of compression, until they are ignited. This ignition is started from the vicinity of the inner wall of the main recess 21c and reaches the central portion of the main recess 21c after being swirled by the swirl S. When the piston passes over TDC, the clearance between the flat face of the top of the piston 1 and the lower wall face of the cylinder head 2 is increased so that the gas in the main recess 21c is forcefully ejected through the opening until it is completely burned.

The Diesel engine of the present embodiment uses a swirl injection nozzle 270c having low fuel penetration so that the fuel spray does not collide with the inner wall of the main recess 21c. As a result, the Diesel engine has advantages in that the fuel droplets do not become coarse due to collisions while forming no liquid film of fuel, the swirl injection nozzle 3 has excellent fuel atomizing characteristics, and the combustion is promoted by both the swirl S and the turbulences A generated by the effective use of the swirl S to thereby effect complete combustion.

As a result, the Diesel engine of the present embodiment can enjoy advantages in that smoking is suppressed to reduce emissions of hydro-carbons, carbon monoxide (CO) and particulate, etc., and in that the fuel spray injected from the swirl injection nozzle 270c are carried by the swirl S to the vicinity of the inner wall of the main recess 21c and distributed continuously by the turbulences A to thereby shorten the ignition delay and to reduce noise to a low level.

Moreover, the Diesel engine of the present embodiment has further advantages in that the engine friction is reduced to enhance the mechanical efficiency, and the fuel consumption rate is additionally reduced thanks to the aforementioned complete combustion.

Thanks to the use of the swirl injection nozzle 270c having a weak fuel penetration, no intense swirl is required so as to avoid collisions of the fuel against the inner walls of the main and auxiliary recesses 21c and 23c, to thereby allow a reduction in the flow resistance of the helical port in the vicinity of the intake valve as well as the intake port so that the volumetric efficiency ($\eta v$) of the intake air into the combustion chamber can be enhanced. Thus, the flow rate of the intake air for a given cylinder volume can be increased to increase the flow rate of the fuel to be burned for a given excess air ratio, to thereby increase the engine output.

Although the foregoing description is directed to representative examples of the present invention, the present invention should not be limited thereto. The elements combined in the respective embodiments can be modified among the embodiments.

A variety of design changes and additions can be made consistent with the spirit of the invention.

More specifically, the shapes and construction of the recesses and lands to be formed in the upper portion of the piston in accordance with the present invention should not be limited to the embodiments thus far described but may be extended to those of FIGS. 15 to 18, in which a plurality of lands are interposed between the main recess and the auxiliary recesses, in which the projections and the auxiliary recesses are connected through straight lines, in which the auxiliary recesses are arranged asymmetrically with respect to the axis of the main recess, and in which six auxiliary recesses are arranged. These modifications can enjoy operational effects substantially similar to those of the foregoing embodiments.

Figure 19A:
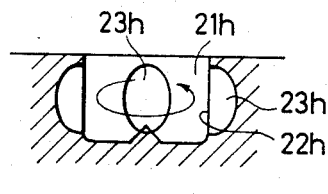
Figure 20A:
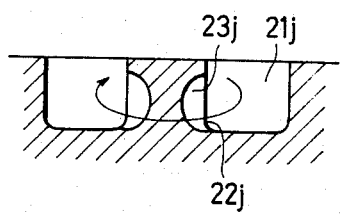
Figure 19B:
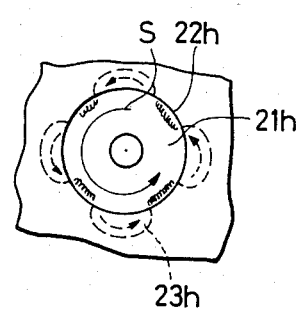
Figure 20B:
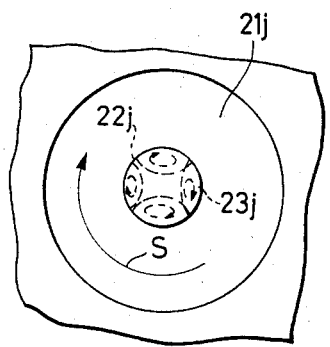

In addition, the positions and placement arrangements of the recesses and projections should not be limited to those of the foregoing embodiments, in which they are arranged in the piston, but can be applied to other elements such as the cylinder head or the block forming the combustion chamber. These modifications can also enjoy operational effects substantially similar to those of the aforementioned respective embodiments. Moreover, the relationships of the arrangements and constructions between the main recess and the auxiliary recesses should not be limited to the foregoing embodiments, in which the auxiliary recesses are opened toward the main recess and the top portion of the piston, but can be modified, as shown in FIGS. 19(A) and 19(B), such that auxiliary recesses 23h are opened toward the inner circumferential wall of a main recess 21h and in which those open edges are formed with projections 22h but are not opened toward the top portion of the piston. Still moreover, the auxiliary recesses should not limited to the foregoing embodiments, in which they are formed around the main recess, but can be modified, as shown in FIGS. 20(A) and 20(B), such that auxiliary recesses 23j are arranged only in the inner circumference of a main recess 21j and are opened toward the main recess 21j and toward the top portion of the piston, and such that the projections are formed in an open edge to thereby generate the secondary swirls inside of the main swirl. Both of those alternatives can also enjoy operational effects substantially similar to those of the foregoing embodiments. Furthermore, the auxiliary recesses should not be limited to the foregoing respective embodiments, in which the depth $t_2$ is made substantially equal to the depth $t_1$ of the main recess, but may be modified such that the depth $t_2$ is either larger or smaller and is within a preferred range of $1.4 \geq t_2/t_1 \geq 0.4$. Either or these modifications can also enjoy operational effects substantially similar to those of the foregoing embodiments.

Figure 21:
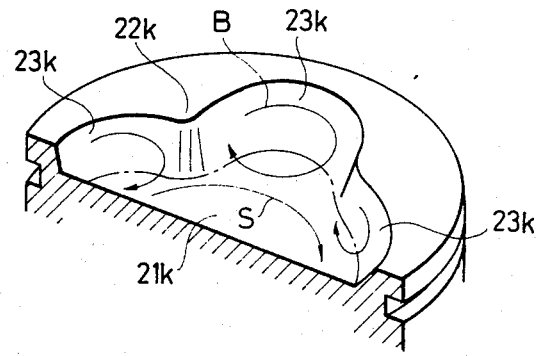

The walls of auxiliary recesses 23k should not be limited to the straight shape of the foregoing embodiments but can be modified, as shown in FIG. 21, such that they are formed in an arcuate or inclined shape to thereby increase the flow efficiency.

Figure 22:
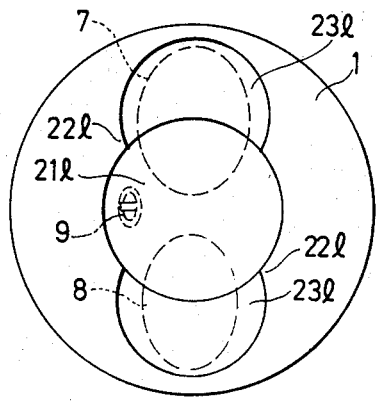
FIGS. 22 to 27 are sectional views showing, respectively, examples of various internal combustion engines according to the present invention.
Figure 23:
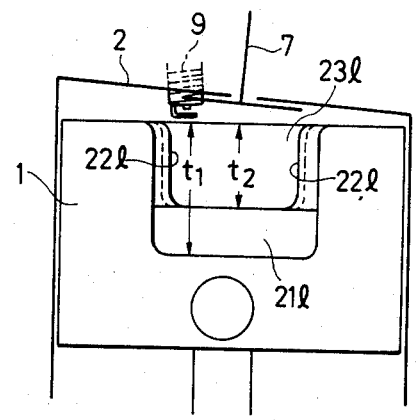

The present invention can be applied to a variety of internal combustion engines, as shown in FIGS. 22 to 27, while still enjoying these operational effects. As shown in FIGS. 22 and 23, more specifically, a main recess 21l and auxiliary recesses 23l of the present invention are formed in a wedge type internal combustion engine in which the lower face of the cylinder head 2 is sloped at about 10 to 20 degrees whereas the top face of the piston 1 is flat. The main recess 21l and the respective auxiliary recesses 23l have different depths, and the respective auxiliary recesses 23l also act at recesses for the intake and exhaust valves 7 and 8 whereas projections 22l are formed into a wedge shape thereby to efficiently effect the turbulence generation. In addition, the valve areas can be made large so that the bending angle of the connection between the intake pipe and the valve seat can be made large. This modification can also enjoy the effect that the flow resistance to the intake air can be reduced.

Figure 24:
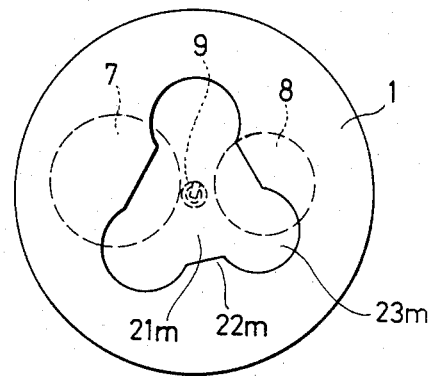
Figure 25:
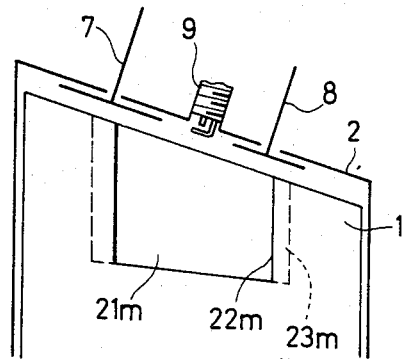

Next, as shown in FIGS. 24 and 25, a main recess 21m and auxiliary recesses 23m of the present invention are formed in an inclined pancake type internal combustion engine in which both the lower face of the cylinder head 2 and the top face of the piston 1 are sloped. The main recess 21m and the three auxiliary recesses 23m have an equal depth and are made to have straight communications. Projections 2m are formed into plural wedge shapes to enjoy the operational effects of the foregoing respective embodiments as well as efficiency in effecting turbulence generation.

Figure 26:
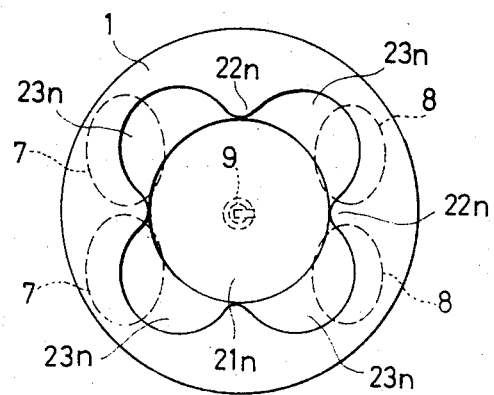
Figure 27:
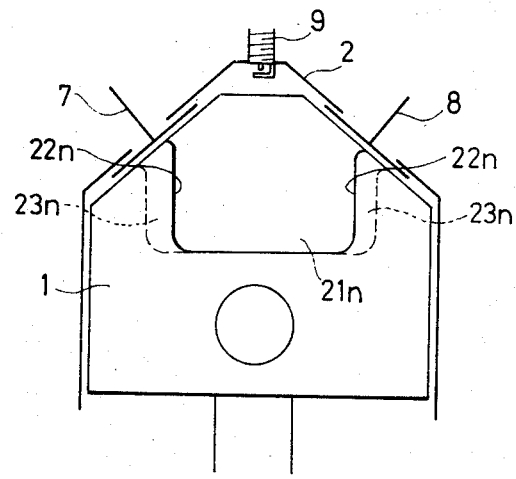

As shown in FIGS. 26 and 27, a main recess 21n and auxiliary recesses 23n of the present invention are formed in an internal combustion engine in which both the lower face of the cylinder head and the top face of the piston 1 are formed into a roof shape (i.e., a pent-roof design). This engine is equipped with two intake valves 7 and two exhaust valves 8, i.e., four valves in total, and the four respective auxiliary recesses 23n act as the recesses of the intake and exhaust valves 7 and 8 whereas projections 22n efficiently cause turbulence generation while enjoying the operational effects of the foregoing embodiments.

The present embodiments have a construction in which the main and auxiliary recesses and the projections are arranged in the top portion of the piston, but the invention should not be limited to that construction. In the case of an engine having a combustion chamber of a predetermined volume between the lower face of the cylinder head and the top face of the piston, the same operational effects can be enjoyed, while ensuring the generation and longevity of suitable swirls and turbulences to improve combustion, by otherwise satisfying the relationships concerning the aforementioned main and auxiliary recesses, the aforementioned projections, and so on.

What is claimed is:

1. A turbulence generating method for a reciprocating internal combustion engine in which there are provided a combustion chamber defined by a piston, a cylinder head and a cylinder block, main and auxiliary recesses provided in said combustion chamber, said main and auxiliary recesses being connected through at least two projected portions;
    an intake swirling mechanism for supplying intake air into said combustion chamber, including a swirling mechanism for swirling intake air, comprising the steps of generating a swirl of intake air in said main recess by means of said swirling mechanism and accelerating said swirl in said main recess as said piston rises;
    forming a turbulent layer while occasionally converting said swirl into turbulences by means of said projected portions;
    generating secondary swirls in said auxiliary recesses different from said swirl and counter-rotating to said swirl; and
    further generating a layer of turbulences between said swirl and said secondary swirls for separating said swirl from said secondary swirls, to thereby improve the combustion efficiency of said engine.

2. A reciprocating internal combustion engine, comprising;
    a combustion chamber defined by a piston, a cylinder head and a cylinder block; and
    an intake swirling mechanism for supplying intake air into said combustion chamber, and including a swirling mechanism for swirling the intake air,
    said combustion chamber being formed with a main recess for introducing and accelerating the swirl of the intake air, which is generated by said swirling mechanism,
    said main recess being formed with at least two projected portions for forming a turbulent layer while occasionally converting said swirl into a turbulence, said main recess being formed with auxiliary recesses for accommodating secondary swirls different from and counter-rotating to said swirl and for further generating a layer of turbulences between said swirl and said secondary swirls for separating said swirl from said secondary swirl, to thereby improve the combustion efficiency of said internal combustion engine.

3. A reciprocating internal combustion engine according to claim 2, further comprising a fuel supply device disposed in said intake mechanism and including one of a carburetor and a fuel injection nozzle for supplying a predetermined amount of fuel to the intake air to prepare an air-fuel mixture, and means for spark-ignition and burning of said mixture in said combustion chamber at a predetermined timing.

4. A reciprocating internal combustion engine according to claim 2, further comprising;
  a fuel supply device disposed in said combustion chamber and including a fuel injection nozzle having communication with a fuel supply source for injecting a predetermined amount of fuel directly into said combustion chamber; and
  an ignition device for igniting and burning the injection fuel to thereby ignite and burn the fuel supplied directly into said combustion chamber.

5. A reciprocating internal combustion engine according to claim 2, further comprising a fuel supply device disposed in the main recess of said combustion chamber and including a fuel injection nozzle having communication with a fuel supply source for injecting a predetermined amount of fuel directly into said main recess, the intake air being compressed adiabatically, as said piston rises, thereby to compress, ignite and burn the fuel injected directly into said main recess.

6. A reciprocating internal combustion engine according to claim 2, wherein said combustion chamber is formed into a wedge type in which substantially the entirety of the lower face of said cylinder head is sloped whereas the top face of said piston is flat.

7. A reciprocating internal combustion engine according to claim 6, wherein said respective auxiliary recesses also act at recesses for an intake valve and an exhaust valve provided in said cylinder head.

8. A reciprocating internal combustion engine according to claim 2, wherein said combustion chamber is formed into an inclined pancake type in which both the lower face of said cylinder head and the top face of said piston are sloped at a substantially constant angle.

9. A reciprocating internal combustion engine according to claim 2, wherein said combustion chamber is formed into a shape in which both the lower face of said cylinder head and the top face of said piston are formed into a roof shape.

10. A reciprocating internal combustion engine according to claim 2, wherein the number of said projected portion is from 2 to 6.

11. A reciprocating internal combustion engine according to claim 2, wherein said auxiliary recesses are arranged symmetrically with respect to the axis of said main recess.

12. A reciprocating internal combustion engine according to claim 2, wherein said auxiliary recesses are arranged asymmetrically with respect to the axis of said main recess.

13. A reciprocating internal combustion engine according to claim 2, wherein the ratio of the distance $D_2$ between facing sides of said projected portions to the distance $D_1$ between facing sides of said auxiliary recesses is set so as to satisfy the following relationship:

$$0.9 \geq D_2/D_1 \geq 2.5$$

14. A reciprocating internal combustion engine according to claim 2, wherein said main recess and said auxiliary recesses are arranged in the top of said piston, and wherein the ratio of the depth $t_2$ of said auxiliary recesses taken in the axial direction of said piston to the depth $t_1$ of said main recess taken in the same direction is set so as to satisfy the following relationship:

$$1.4 \geq t_2/t_1 \geq 0.4$$

15. A reciprocating internal combustion engine according to claim 2, wherein the bottom surface of said main recess contain no projected portion.

16. A reciprocating internal combustion engine according to claim 2, wherein the total volume of said auxiliary recesses is less than the volume of said main recess.

17. A reciprocating internal combustion engine according to claim 2, wherein the distance between the opposed inner walls of said auxiliary recess is gradually increased toward said main recess.

18. A reciprocating internal combustion engine according to claim 2, wherein a spark plug whose ignition point is arranged to face said main recess is provided at said cylinder head.

* * * * *